US011526799B2

(12) United States Patent
Moore et al.

(10) Patent No.: US 11,526,799 B2
(45) Date of Patent: Dec. 13, 2022

(54) IDENTIFICATION AND APPLICATION OF HYPERPARAMETERS FOR MACHINE LEARNING

(71) Applicant: salesforce.com, inc., San Francisco, CA (US)

(72) Inventors: Kevin Moore, San Francisco, CA (US); Leah McGuire, Redwood City, CA (US); Eric Wayman, San Francisco, CA (US); Shubha Nabar, Sunnyvale, CA (US); Vitaly Gordon, Sunnyvale, CA (US); Sarah Aerni, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 812 days.

(21) Appl. No.: 16/264,583

(22) Filed: Jan. 31, 2019

(65) Prior Publication Data
US 2020/0057958 A1 Feb. 20, 2020

Related U.S. Application Data

(60) Provisional application No. 62/764,667, filed on Aug. 15, 2018.

(51) Int. Cl.
*G06N 20/00* (2019.01)
*G06N 5/04* (2006.01)

(52) U.S. Cl.
CPC ............. *G06N 20/00* (2019.01); *G06N 5/048* (2013.01)

(58) Field of Classification Search
CPC .......... G06N 20/00; G06N 5/048; G06N 5/003
See application file for complete search history.

(56) References Cited

U.S. PATENT DOCUMENTS

| 10,474,926 B1* | 11/2019 | Dirac ................... G06K 9/6227 |
| 2010/0280979 A1 | 11/2010 | Raaijmakers |
| 2016/0110657 A1* | 4/2016 | Gibiansky .............. G06N 20/00 706/12 |
| 2016/0182553 A1* | 6/2016 | Tripp .................... G06F 21/562 726/25 |

(Continued)

OTHER PUBLICATIONS

Jimenez et al., "Finding Optimal Model Parameters by Discrete Grid Search," in E. Corchado et al. (Eds.): Innovations in Hybrid Intelligent Systems, ASC 44, pp. 120-127, 2007 (Year: 2007).*

(Continued)

*Primary Examiner* — Miranda M Huang
*Assistant Examiner* — Yao David Huang
(74) *Attorney, Agent, or Firm* — Butzel Long; Donald J. Lecher (57) ABSTRACT

Methods and systems are provided to determine suitable hyperparameters for a machine learning model and/or feature engineering process. A suitable machine learning model and associated hyperparameters are determined by analyzing a dataset. Suitable hyperparameter values for compatible machine learning models having one or more hyperparameters in common and a compatible dataset schema are identified. Hyperparameters may be ranked according to each of their respective influences on a model performance metrics, and hyperparameter values identified as having greater influence may be more aggressively searched.

8 Claims, 5 Drawing Sheets

(56) References Cited

U.S. PATENT DOCUMENTS

| | | | | |
|---|---|---|---|---|
| 2017/0223036 | A1* | 8/2017 | Muddu | H04L 43/08 |
| 2018/0060738 | A1* | 3/2018 | Achin | G06Q 10/04 |
| 2018/0240041 | A1* | 8/2018 | Koch | G06F 16/24578 |
| 2019/0362222 | A1* | 11/2019 | Chen | G06N 20/00 |
| 2019/0385052 | A1* | 12/2019 | Bauer, Jr. | G06N 3/08 |
| 2020/0311572 | A1* | 10/2020 | Baker | G06N 3/0454 |

OTHER PUBLICATIONS

Gomes et al., "Combining Meta-Learning and Search Techniques to SVM Parameter Selection," 2010 Eleventh Brazilian Symposium on Neural Networks (Year: 2010).*

Bergstra et al., "Random Search for Hyper-Parameter Optimization," Journal of Machine Learning Research 13 (2012) 281-305 (Year: 2012).*

Wistuba et al., "Hyperparameter Search Space Pruning—A New Component for Sequential Model-Based Hyperparameter Optimization" in A. Appice et al. (Eds.): ECML PKDD 2015, Part II, LNAI 9285, pp. 104-119, 2015 (Year: 2015).*

Feurer et al., "Initializing Bayesian Hyperparameter Optimization via Meta-Learning,"Association for the Advancement of Artificial Intelligence (2015), retrieved from <https://aad.informatik.uni-freiburg.de/wp-content/uploads/papers/15-AAAI-MI-SMBO.pdf> (Year: 2015).*

Wistuba et al., "Two-Stage Transfer Surrogate Model for Automatic Hyperparameter Optimization" in P. Frasconi et al. (Eds.): ECML PKDD 2016, Part I, LNAI 9851, pp. 199-214, 2016 (Year: 2016).*

Li et al., "Hyperband: Bandit-based Configuration Evaluation for Hyperparameter Optimization," ICLR 2017 (Year: 2017).*

Van Rijn et al., "Hyperparameter Importance Across Datasets," arXiv:1710.04725v2 [stat.ML] May 29, 2018 (Year: 2018).*

International Preliminary Report on Patentability for App. No. PCT/US2019/046622, dated Feb. 25, 2021, 12 pages.

Wikipedia, "Hyperparameter optimization", retrieved from the Internet: URL: https://en.wikipedia.Org/w/index.php?title=Hyperparameter_optimization&oldid-850951273, retrieved on Sep. 17, 2019, Jul. 19, 2018, pp. 1-3, XP055622861.

International Search Report and Written Opinion for Application No. PCT/US2019/046622, dated Sep. 25, 2019, 17 pages.

Van Rijn, et al., "Hyperparameter Importance Across Datasets," KDD '18, Aug. 19-23, 2018, United Kingdom, 10 pages.

Summons to attend oral proceedings issued in App. No. EP19762272.3, dated Jul. 19, 2022, 12 pages.

Anonymous: "Hyperparameter optimization", Jul. 19, 2018, pp. 1-3, XP055622861, retrieved from the Internet: URL: https://en.wikipedia.org/w/index.php?title=Hyperparameter_optimization&oldid=850951273.

* cited by examiner

IDENTIFICATION AND APPLICATION OF HYPERPARAMETERS FOR MACHINE LEARNING

BACKGROUND

Some machine learning algorithms may require hyperparameters, which affect how the algorithm executes. For example, the hyperparameters may set the number of iterations, size of samples, level of complexity, and may reflect assumptions about the machine learning model and training data. Hyperparameters may also exist for feature engineering algorithms and may similarly affect how feature engineering is carried out. A data scientist may attempt to discover the optimal hyperparameters for a given machine learning algorithm and/or feature engineering algorithm based on heuristics and his or her experience, but this approach may be inconsistent and unreliable across varying datasets, machine learning algorithms, and data scientists.

Hyperparameters also may be searched algorithmically using a brute force approach. A search algorithm may execute to find the optimal hyperparameters within the set of all possible combinations, but this approach may require an exponentially larger amount of computing time as the number of hyperparameters increases. Compounding the problem, the search algorithm may require its own hyperparameters, and significant time may be spent tuning those hyperparameters to achieve a useable search result.

BRIEF SUMMARY

According to an embodiment of the disclosed subject matter, computer-implemented systems, media, and methods may include receiving a first dataset having a first data schema, generating metadata based on properties of the dataset, selecting, by a computer processor, based on the metadata, a machine learning model suitable for application to the dataset, identifying, for each hyperparameter of a plurality of hyperparameters associated with the selected machine learning model, a degree of influence of the each hyperparameter on one or more performance metrics of the selected machine learning model, identifying a first version of the selected machine learning model, obtaining a plurality of previously stored hyperparameter values associated with the first version of the selected machine learning model based on identifying a second version of the selected machine learning model having one or more hyperparameters in common with the first version of the selected machine learning model, and identifying a similarity between the first data schema and a second data schema of a second dataset associated with the second version of the selected machine learning model, and determining a range of values for one or more of the previously stored hyperparameter values based on a threshold. For each hyperparameter of the plurality of hyperparameters associated with the first version of the selected machine learning model that is in common with a hyperparameter of the one or more hyperparameters associated with the second version of the selected machine learning model, the method may include selecting, based on the identified degree of influence for each associated hyperparameter and from the determined range of values, a first group of hyperparameter values, and for each hyperparameter of the plurality of hyperparameters associated with the first version of the selected machine learning model that is not in common with a hyperparameter of the one or more hyperparameters associated with the second version of the selected machine learning model, the method may include selecting, based on the identified degree of influence for each associated hyperparameter, a second group of hyperparameter values. The method may additionally include training the first version of the selected machine learning model using the first selected group of hyperparameter values, the second selected group of hyperparameter values, and the dataset. The metadata may include at least one selected from a size of the training set, a shape of the dataset, a number of features in the dataset, a percentage of types of data fields in the dataset, a type of classification problem, a variance of types of data fields in the dataset, and an indication whether the dataset follows a statistical distribution. The method may further include executing a secondary machine learning model based on the metadata as input, the secondary machine learning model returning selection of the first version of the selected machine learning model and returning suitable machine learning hyperparameter values for use with the first version of the selected machine learning model. The one or more performance metrics may include at least one of accuracy, error, precision, recall, area under the receiver operating characteristic (ROC) curve, and area under the precision recall curve. The method may further include executing a secondary machine learning model using the plurality of hyperparameters associated with the first version of the selected machine learning model as input, the secondary machine learning model returning a ranking of the plurality of hyperparameters according to the degree of influence on the one or more performance metrics of the first version of the selected machine learning model. The method may further include identifying the hyperparameter value for each of the plurality of hyperparameters based on a search, the search having a variable granularity, wherein the granularity of the search corresponds to the degree of influence of each of the plurality of hyperparameters on the one or more performance metrics of the first version of the selected machine learning model. The method may further include identifying a hyperparameter value within the determined range of values for one or more of the hyperparameters of the first version of the selected machine learning model based on a search, the search having a variable granularity, wherein the granularity of the search corresponds to a degree of influence of each of the plurality of hyperparameters on one or more performance metrics of the first version of the selected machine learning model. The method may further include identifying a hyperparameter value within the determined range of values for one or more of the hyperparameters of the first version of the selected machine learning model based on a search, the search having a variable granularity, wherein the granularity of the search corresponds to a degree of influence of each of the plurality of hyperparameters on one or more performance metrics of the first version of the selected machine learning model. The size of the threshold may vary based on a degree of influence of the one or more previously stored hyperparameters on one or more performance metrics of the first version of the selected machine learning model.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Embodiments disclosed herein provide for techniques of identifying parameters for use in a machine learning model based upon repeatable techniques that may be efficiently performed by an automated, computerized system. Suitable hyperparameters for a machine learning model may be initially identified, for example, by examining the data upon which the machine learning model will operate and comparing the data to prior data used in conjunction with other machine learning models. A suitable machine learning model may then be selected based upon the similarity of the data being examined to other datasets for which suitable machine learning models are known. Alternatively or in addition, hyperparameters to be searched when training the selected machine learning model may be identified based upon the relative contribution of the hyperparameters to performance of the model, as determined by one or more performance metrics associated with the model. Alternatively or in addition, the values to be searched and/or the granularity with which to search individual hyperparameter values may be identified using the automated and computerized techniques disclosed herein.

As used herein, the term "suitable" refers to a parameter or parameter value that achieves correct operation of a system, such as a machine learning system. A suitable value may be the least preferable value within a range of possible values, but still achieves correct operation of the system. Preferably, a suitable value may be said to achieve system operation that is improved when compared with another value within a range of possible values, but may not be the best possible value.

The term "algorithm" as used herein refers to both a single algorithm or a plurality of algorithms that may be used simultaneously, or successively in a "stacked" manner.

The term "model" refers as used herein to a machine learning algorithm together with an associated one or more suitable parameters and/or hyperparameters.

A machine learning system may allow a data scientist to create machine learning models. The data scientist may collect one or more datasets from a variety of sources, such as databases. A feature engineering algorithm may extract features of interest from the dataset. The feature engineering algorithm may then modify the extracted features, create new features, and remove features to create a new, feature-engineered dataset. The data scientist may then select a machine learning algorithm to create a model based on the feature-engineered dataset. This is also known as training the model. The machine learning algorithm may be configured using one or more parameterized values that specify how the machine learning algorithm will be executed, known as hyperparameters. Generally, the data scientist may develop custom metrics that may be of prioritized importance in addressing the problem at-hand. Metrics may include, for example, accuracy, error rate, development time, precision, and recall. It is important to select the hyperparameter values that will cause the machine learning algorithm to execute in accordance with the data scientist's needs as closely as possible. It should be appreciated that the feature engineering algorithm, as previously discussed, may also be configured using hyperparameters to similarly affect its manner of execution.

The present subject matter discloses an automated and computer-based method for identifying and applying hyperparameters to machine learning and/or feature engineering algorithms. Several embodiments are disclosed, which may be used individually, jointly, or in any combination therebetween. Similarly, the processes employed within each embodiment may be performed in simultaneously, asynchronously, or in a different order than shown and described.

In an embodiment, a disclosed method may provide for receiving a dataset and generating metadata based on properties of the dataset. The metadata may then be used to identify both a suitable machine learning model along with suitable hyperparameter values. The identified machine learning model may then be configured to train using the identified, suitable hyperparameters and the received dataset.

In an embodiment, a disclosed method may select a machine learning model and train one or more models using one or more datasets. From the one or more subsequently trained models, one or more hyperparameters having a greater influence on the model behavior across one or more of the datasets may be identified and compiled into a list. For each hyperparameter on the list, a range of values may be searched to identify suitable values that cause the machine learning model to perform in accordance with the performance metrics that may be specified by the data scientist. The selected machine learning model may then be configured to train using the identified, suitable hyperparameter values.

In an embodiment, a disclosed method may select a machine learning model and dataset. The dataset may be arranged according to a schema. The method may receive version data associated with the selected machine learning model. The method may identify previously-used hyperparameter values for a machine learning model that corresponds to the selected machine learning model based on one or both of the version data and dataset schema associated with the previously-used hyperparameter values. Based on the previously-used hyperparameter values, a range of values may be searched within a threshold range to identify suitable values that cause the machine learning model to perform in accordance with the performance metrics that may be specified by the data scientist. The selected machine learning model may then be configured to train using the identified, suitable hyperparameter values.

Figure 1:
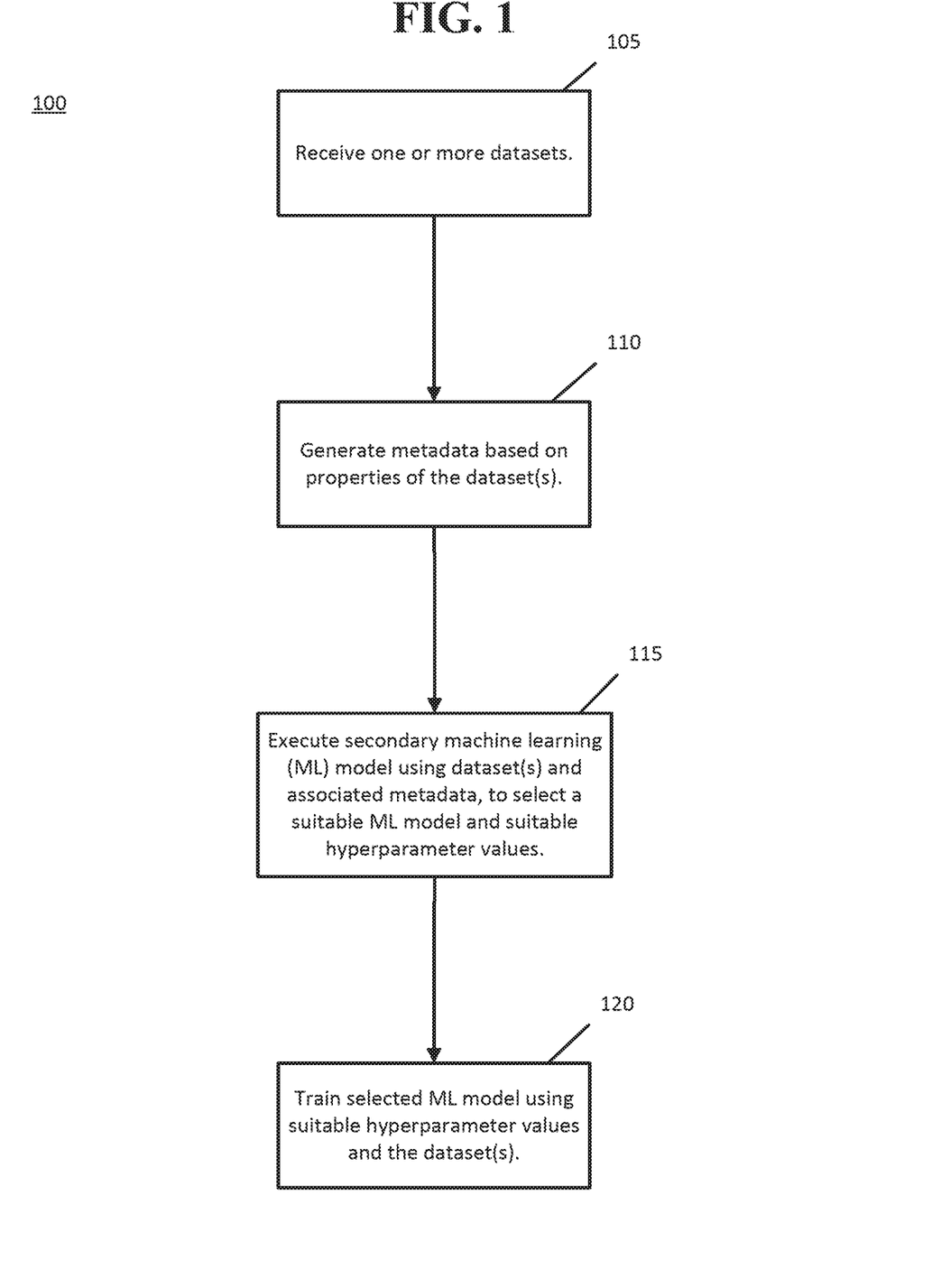
FIG. 1 illustrates an example method for determining the optimal hyperparameters for a machine learning model according to an embodiment of the disclosed subject matter.

FIG. 1 illustrates an example flow diagram 100 of a method for selecting a suitable machine learning model and associated hyperparameters based on one or more datasets. In 105, the system obtains one or more datasets, for example by receiving it from the system, such as in response to a selection of the dataset by a data scientist or other user. The datasets may be for example, tenant datasets containing customer data, and subject to privacy and security protocols. Accordingly, a user of the machine learning system (e.g., a data scientist or computer engineer) may be restricted from viewing some or all of the data contained within the one or more datasets received in 105, based on a permission level. The datasets received in stage 105 may be combined and randomly split to create a training set and hold-out set. The training set may be used to subsequently train the selected machine learning model in stage 120, while the hold-out set may be used to assess the accuracy of the selected machine learning model. In 110, metadata may be generated describing properties of the datasets received in 105 and may be based on the datasets, other data available to the system, and data input by a system user. The metadata may be generated based on all datasets jointly or on a per-dataset basis. The metadata may be generated by a separate dataset preprocessing stage or in combination with another machine learning process as described in further detail herein. The metadata may include data describing, for example, the size and shape of the dataset, the number of fields in the dataset, the percentage breakdown of types of fields in the dataset (e.g., categorical, numeric, text), the type of the classification problem, the dataset variance, whether there are correlations between the data and the label, whether the dataset follows statistical distributions, and the like. Subsequent to generation of the metadata in stage 110, the metadata may be saved in a database or other data structure according to conventional methods.

In stage 115, a suitable machine learning model may be selected from a plurality of machine learning models based at least on the metadata generated in 110. The machine learning model may be selected in-part, according to its known advantages and may select one machine learning model over another based on the content of the dataset and the metadata describing it. For example, if the metadata reveals that a dataset contains a large proportion of categorical data, then a machine learning model may be selected that is known to perform well on categorical data. Stage 115 may be performed by a secondary machine learning model. The secondary machine learning model may accept the one or more datasets and associated metadata, and based on the one or more datasets and metadata, return a selected machine learning model and suitable hyperparameter values for the hyperparameters associated with the selected machine learning model. It should be appreciated that hyperparameter values may be numeric or non-numeric. The secondary machine learning model may operate according to any conventional machine learning algorithm, such as grid search, random search, Bayesian methods, and the like. In 120, the suitable machine learning model selected in 115 may be trained using the selected suitable hyperparameter values and the dataset(s) received in 105.

Figure 2A:
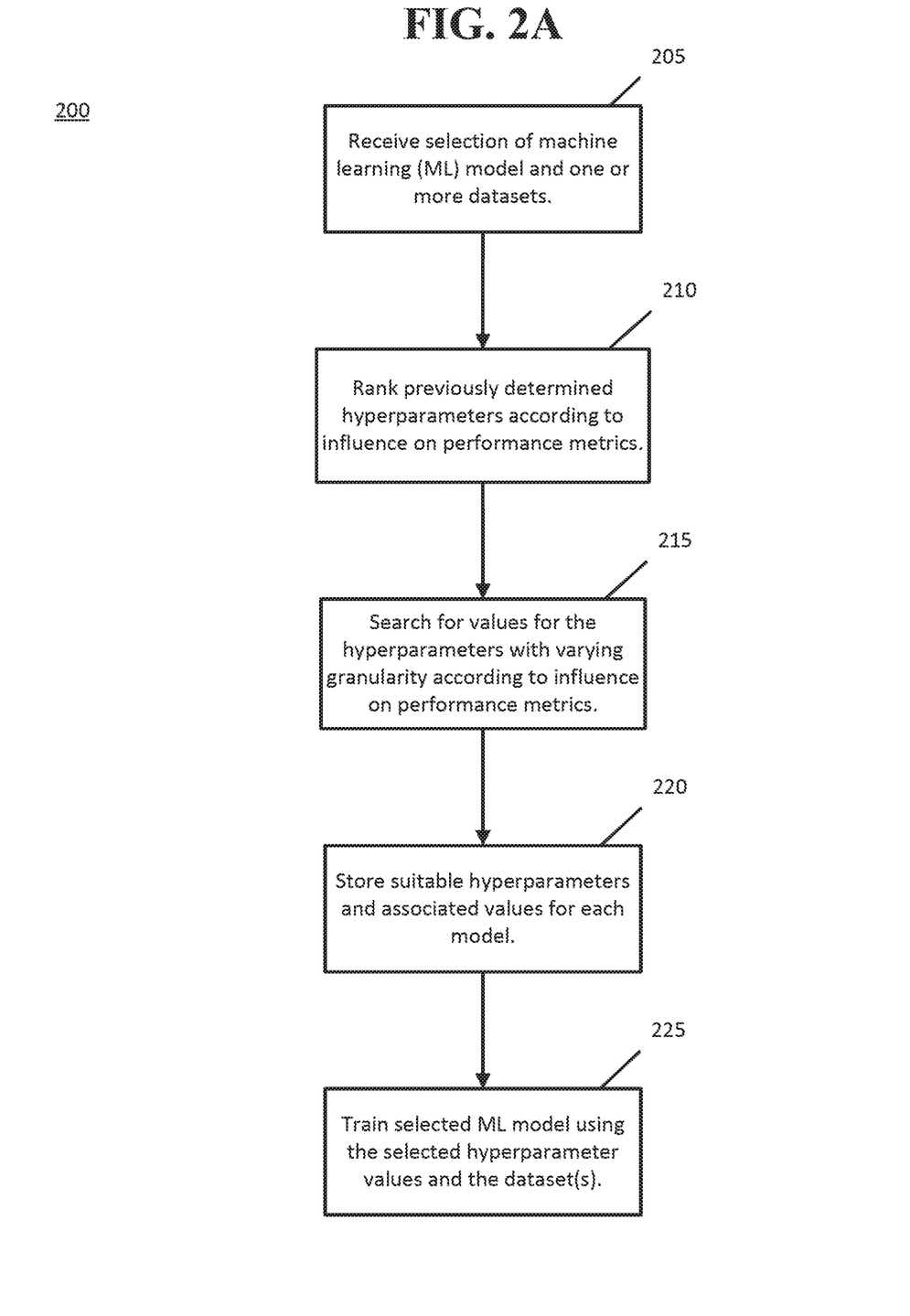
FIG. 2A illustrates an example method for determining the optimal hyperparameters for a machine learning model according to an embodiment of the disclosed subject matter.

FIG. 2A illustrates an example flow diagram 200 for selecting one or more suitable values for machine learning model hyperparameters. In 205, the method receives a selection of a machine learning model and one or more datasets. The machine learning model may be selected according to method 100 via the secondary machine learning model in stage 115, selected by a user, or selected according to other conventional methods known in the art. The machine learning model selected in 205 may have previously trained across a plurality of datasets and may have generated data useful in determining a degree of influence with respect to performance metrics for each hyperparameter associated with the selected machine learning model. The performance metrics may be determined automatically or by a data scientist and may include, for example, accuracy, error, precision, recall, area under the precision-recall curve (AuPR), area under the receiver operating characteristic curve (AuROC), and the like. It should be appreciated that the selection of one or more performance metrics may be relevant in assessing whether one hyperparameter value is better than another, and that no one hyperparameter value may perform better than all other hyperparameter values in view of every performance metric.

In stage 210, the method 200 may identify and rank the hyperparameters associated with the machine learning model selected in stage 205 according to their respective influence on the one or more performance metrics. This may be achieved using a secondary machine learning model that receives the previously-discussed data resulting from training the selected machine learning model across the plurality of datasets and one or more selected performance metrics and returns a ranking of the associated hyperparameters according to their respective influence on the one or more selected performance metrics. The secondary machine learning model may utilize a random forest algorithm or other conventional machine learning algorithms capable of computing hyperparameter importance in a model.

Having identified and ranked the hyperparameters according to influence in stage 210, stage 215 may search for suitable hyperparameter values using any conventional machine learning algorithm. Preferably, a grid search algorithm may be used that allows for specifying the size and/or granularity of the search for each hyperparameter. Hyperparameters determined to have a stronger influence on the performance metrics may be searched for suitable values with greater granularity. Hyperparameters determined to have a weaker influence on the performance metrics may be searched for suitable values with lesser granularity. In this way, computing resources may be more efficiently utilized by allocating time for search where the result may be more productive. For example, for a hyperparameter determined to be strongly influential, 50 possible hyperparameter values may be examined, while for a weakly influential hyperparameter, 5 hyperparameter values may be examined. The search process 215 may then return one or more hyperparameter values for each hyperparameter associated with the machine learning algorithm selected in stage 205.

In stage 220, the hyperparameter values determined in stage 215 may be stored in a hyperparameter store, which may be implemented using any conventional memory device. The hyperparameter store may be indexed by model and include data describing, for example, the time and date when the model was trained, the version of code for algorithms employed by the model, the schema for the dataset on which the model was trained, the performance of the model according to the previously-discussed performance metrics, the values for each hyperparameter of the model, and the like. Future hyperparameter selection may be accelerated by using hyperparameter store to look-up suitable hyperparameter values where matching data can be found, rather than performing each of the steps 210-215. In stage 225, the machine learning model selected in 205 may be trained using the dataset selected in 205 and the selected suitable hyperparameter values determined in stage 215.

Figure 2B:
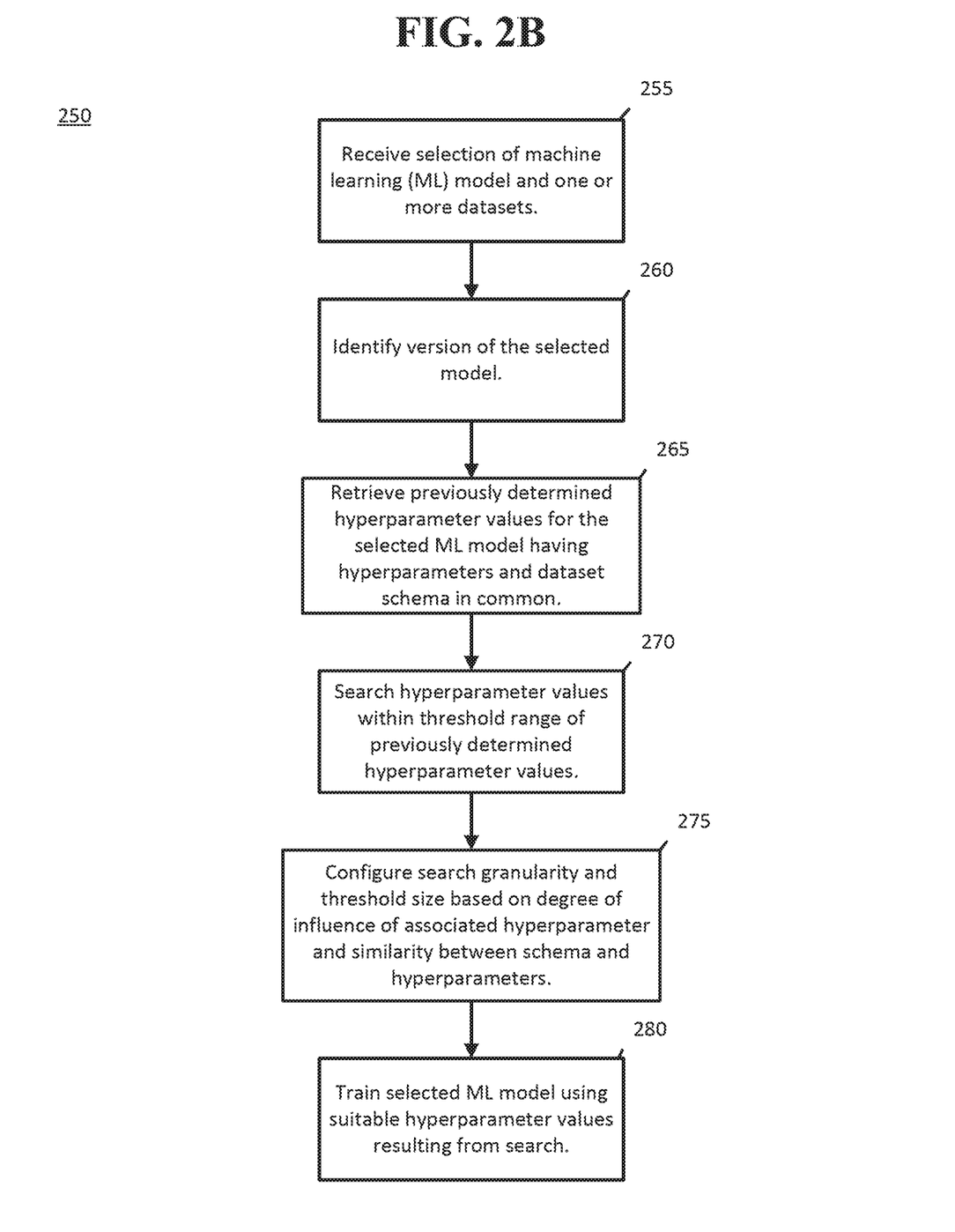
FIG. 2B illustrates an example method for determining the optimal hyperparameters for a machine learning model according to an embodiment of the disclosed subject matter.

FIG. 2B illustrates an example flow diagram 250 for selecting one or more suitable values for machine learning model hyperparameters. In 255, the method receives a selection of a machine learning model and one or more datasets. The machine learning model may be selected according to method 100 via the secondary machine learning model in stage 115, selected by a user, or selected according to other conventional methods known in the art. The machine learning model selected in stage 255 may have an associated version that may be identified in 260. The version may correspond to the version of the machine learning algorithm that the model employs, for example. A newer version of a machine learning algorithm may utilize new hyperparameters that a prior version lacked and/or may have eliminated other hyperparameters. In general, across multiple versions of a machine learning algorithm, all or a majority of hyperparameters may remain the same, so as to warrant an advantage by storing and recalling previously-used, suitable hyperparameters within the hyperparameter store.

In stage 265, the method 250 may retrieve hyperparameters and their associated values previously-used with the selected machine learning model from the hyperparameter store previously described. The retrieved hyperparameters and their associated values may have been previously used with the same version or a different version as the selected machine learning model. As previously discussed with respect to stage 220, the version of the machine learning algorithm may be stored in the hyperparameter store. The hyperparameter store may also associate the schema of the dataset for which the model was trained. Because the dataset may affect the suitability of the hyperparameters, stage 265 may also compare the schema of the dataset selected in 255 with the schema of the dataset stored in the hyperparameter store to assess the similarities and differences.

In stage 270, the hyperparameter values for each previously-used hyperparameter determined to be in common with the hyperparameters of the version of the selected machine learning model may be searched based on a threshold value. For example, if a previously-used hyperparameter value is 10, stage 270 may select a threshold range of 5, so that values between 5 and 15 will be tested for suitability. As previously discussed, the search for suitable hyperparameter values may be carried out using any conventional machine learning algorithm. Preferably, a grid search or equivalent algorithm may be used that allows for specifying the size and/or granularity of the search for each hyperparameter.

In stage 275, hyperparameters determined to have a stronger influence on the performance metrics may be searched for suitable values with greater granularity. Hyperparameters determined to have a weaker influence on the performance metrics may be searched for suitable values with lesser granularity. In this way, computing resources may be more efficiently utilized by allocating time for search where the result may be more productive. For example, for a hyperparameter determined to be strongly influential, 50 possible hyperparameter values between 5 and 15 may be examined, while for a weakly influential hyperparameter, 5 hyperparameter values may be examined between 5 and 15. As previously mentioned, it should be appreciated that hyperparameter values may be numeric or non-numeric. In addition to granularity of the search, the size of the threshold may be varied based on the similarity between the version of the selected machine learning model and the version of the machine learning model for which previously-used hyperparameters are available in the hyperparameter store. Similarity may be determined based, for example, on the number of data fields of the schema of the dataset received in 255 that match the data fields of the dataset schema associated with the previously-used hyperparameter values. Alternatively, or in addition, the similarity may be determined based on the number of hyperparameters in common or different from the hyperparameters of the version of the machine learning model associated with the previously-used hyperparameter values. Where the similarity is identical or otherwise substantial, the threshold may be selected to be smaller in size, while where the similarity is lacking, the threshold may be selected to be larger in size. In this way, a greater number of hyperparameter values may be tested for suitability where it may be less certain that those previously-used hyperparameter values will be suitable for the present use. In stage 280, the machine learning model selected in 255 may be trained using the dataset selected in 255 and the selected suitable hyperparameter values determined in stage 275.

As discussed previously, various embodiments disclosed herein may be used individually, jointly, or in any combination therebetween. For example, the methods 100, 200, and 250 may be utilized jointly to reduce the overall computing effort required to determine a suitable machine learning model and suitable hyperparameters, given one or more selected datasets. In this example, method 100 may be utilized, to select a suitable machine learning model and suitable hyperparameter values for a given dataset. The hyperparameters associated with the hyperparameter values determined in method 100 may be applied to either or both of FIGS. 2A and 2B. In the example of FIG. 2B, the associated values for hyperparameters identified in method 100 may be retrieved from the hyperparameter store where there exists a previously-used hyperparameter value. A threshold size may be set both based on the similarity between the dataset schema and machine learning model hyperparameters. For hyperparameters of the selected machine learning model in common with the previously-used hyperparameters, the hyperparameter values may be searched within a range defined by the threshold size of the previously-used hyperparameter values and with a granularity defined according to their influence as performed in method 200. For hyperparameters not in common with the previously-used hyperparameters, the hyperparameter values may be searched with a granularity defined according to their influence as performed in method 200. The suitable machine learning model determined in stage 115 of method 100 may be subsequently trained using the dataset selected in stage 105, and the hyperparameter values selected both based on their influence on the performance metrics as in stage 215 of method 200 and on the similarity of the dataset schema and machine learning model version stored in the hyperparameter store, as determined in stage 275 of method 250.

Embodiments disclosed herein may allow for more efficient selection of suitable hyperparameters for machine learning models and feature engineering than would be achievable using conventional techniques. For example, the disclosed embodiments may determine suitable machine learning models and the associated hyperparameters more efficiently than comparable conventional machine learning techniques may achieve, and/or using fewer computational resources than would be possible using conventional techniques. This is due to the use of the techniques disclosed herein, which provide for gains in efficiency by reducing the computational time involved by reducing the size of the search space when determining suitable machine hyperparameters for a given use, without a loss of generality or accuracy. Additionally, embodiments disclosed herein may overcome the associated disadvantages appearing in conventional multi-tenant frameworks.

Figure 3:
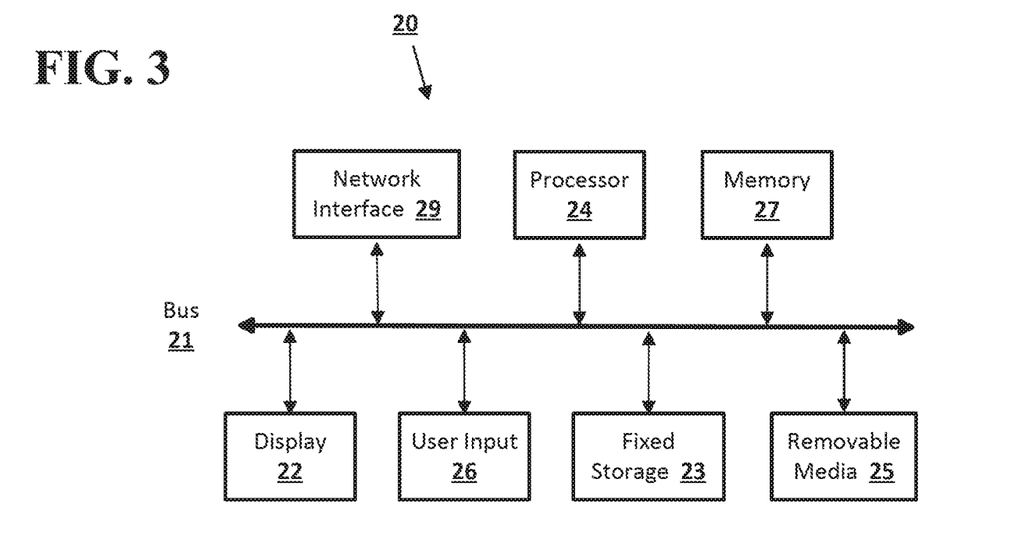
FIG. 3 shows a computing device according to an embodiment of the disclosed subject matter.

Embodiments of the presently disclosed subject matter may be implemented in and used with a variety of component and network architectures. FIG. 3 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth(R), near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
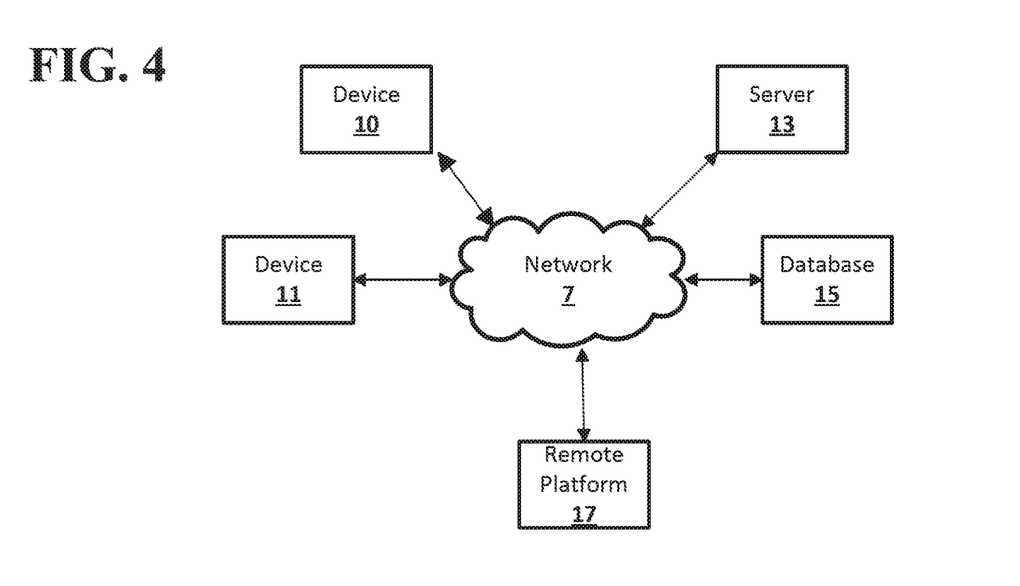
FIG. 4 shows a network configuration according to an embodiment of the disclosed subject matter.

FIG. 4 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 5:
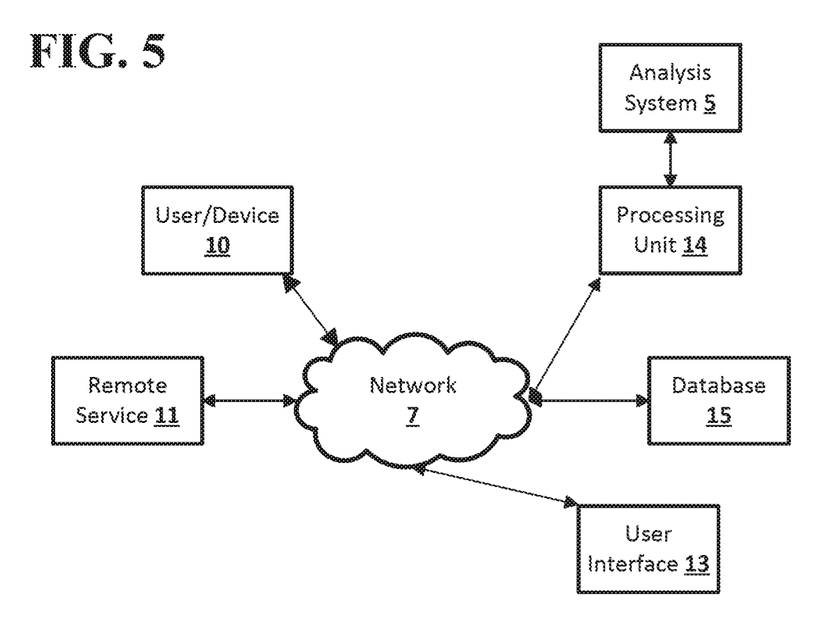
FIG. 5 shows an example network and system configuration according to an embodiment of the disclosed subject matter

FIG. 5 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed in an automated machine learning system, the method comprising:

receiving a first dataset having a first data schema;

generating metadata based on properties of the first dataset;

selecting, by a computer processor, based on the metadata, a machine learning model suitable for application to the first dataset;

identifying, for each hyperparameter of a plurality of hyperparameters associated with the selected machine learning model, a degree of influence of the each hyperparameter on one or more performance metrics of the selected machine learning model, wherein the degree of influence of the each hyperparameter is identified by a secondary machine learning model and is identified based on data resulting from a previous training of the selected machine learning model;

identifying a first version of the selected machine learning model;

obtaining a plurality of previously stored hyperparameter values associated with the first version of the selected machine learning model based on:

identifying a second version of the selected machine learning model having one or more hyperparameters in common with the first version of the selected machine learning model, and identifying a similarity between the first data schema and a second data schema of a second dataset associated with the second version of the selected machine learning model;

determining a range of values for one or more of the previously stored hyperparameter values based on a threshold; and for each hyperparameter of a plurality of hyperparameters associated with the first version of the selected machine learning model that is in common with a hyperparameter of the one or more hyperparameters associated with the second version of the selected machine learning model selecting, based on the identified degree of influence for each associated hyperparameter and from the determined range of values, a first group of hyperparameter values; and for each hyperparameter of the plurality of hyperparameters associated with the first version of the selected machine learning model that is not in common with a hyperparameter of the one or more hyperparameters associated with the second version of the selected machine learning model selecting, based on the identified degree of influence for each associated hyperparameter, a second group of hyperparameter values based on identifying a hyperparameter value within the determined range of values for one or more of the hyperparameters of the selected machine learning model based on a search, wherein a first hyperparameter of the plurality of hyperparameters associated with the selected machine learning model is searched at a first granularity and a second hyperparameter of the plurality of hyperparameters associated with the selected machine learning model is searched at a second granularity different from the first granularity, wherein the first and second granularities are each determined based on the degrees of influence respectively identified for the first hyperparameter and the second hyperparameter in a manner such that a higher identified degree of influence correlates with a higher respective granularity; and training the first version of the selected machine learning model using the first selected group of hyperparameter values, the second selected group of hyperparameter values, and the first dataset.

2. The method of claim 1, wherein the metadata includes at least one selected from the group consisting of:

a size of a training set, a shape of the first dataset, a number of features in the first dataset, a percentage of types of data fields in the first dataset, a type of classification problem, a variance of types of data fields in the first dataset, and an indication whether the first dataset follows a statistical distribution.

3. The method of claim 1, wherein the selecting a machine learning model comprises:

executing a second secondary machine learning model based on the metadata as input, the second secondary machine learning model returning selection of the first version of the selected machine learning model and returning suitable machine learning hyperparameter values for use with the first version of the selected machine learning model.

4. The method of claim 1, wherein the one or more performance metrics includes at least one selected from the group consisting of: accuracy, error, precision, recall, area under the receiver operating characteristic (ROC) curve, and area under the precision recall curve.

5. The method of claim 1, wherein the identifying a degree of influence further comprises:

executing the secondary machine learning model using the plurality of hyperparameters associated with the first version of the selected machine learning model as input, the secondary machine learning model returning a ranking of the plurality of hyperparameters according to the degree of influence on the one or more performance metrics of the first version of the selected machine learning model.

6. The method of claim 1, wherein a size of the threshold varies based on a degree of influence of one or more hyperparameters corresponding to the one or more of the previously stored hyperparameter values on one or more performance metrics of the first version of the selected machine learning model.

7. A method of determining one or more suitable hyperparameters for a machine learning model in an automated machine learning system, the method comprising:
receiving selection of a machine learning model;
receiving a first dataset having a first data schema;
identifying, for each hyperparameter of a plurality of hyperparameters associated with the selected machine learning model, a degree of influence of the each hyperparameter on one or more performance metrics of the selected machine learning model, wherein the degree of influence of the each hyperparameter is identified by a secondary machine learning model and is identified based on data resulting from a previous training of the selected machine learning model;
identifying a first version of the selected machine learning model;
receiving a plurality of previously stored hyperparameter values associated with the selected machine learning model based on:
identifying a second version of the selected machine learning model having one or more hyperparameters in common with the first version of the selected machine learning model, and identifying a similarity between the first data schema and a second data schema of a second dataset associated with the second version of the selected machine learning model; determining a range of values for one or more of the previously stored hyperparameter values based on a threshold;
selecting values for one or more hyperparameters of the selected machine learning model from the determined range of values based on identifying a hyperparameter value within the determined range of values for one or more of the hyperparameters of the selected machine learning model based on a search, wherein a first hyperparameter of the plurality of hyperparameters associated with the selected machine learning model is searched at a first granularity and a second hyperparameter of the plurality of hyperparameters associated with the selected machine learning model is searched at a second granularity different from the first granularity, wherein the first and second granularities are each determined based on the degrees of influence respectively identified for the first hyperparameter and the second hyperparameter in a manner such that a higher identified degree of influence correlates with a higher respective granularity; and
training the first version of the selected machine learning model using the selected values.

8. The method of claim 7, wherein a size of the threshold varies based on a degree of influence of one or more hyperparameters corresponding to the one or more of the previously stored hyperparameter values on one or more performance metrics of the selected machine learning model.

\* \* \* \* \*